United States Patent Office 3,301,286
Patented Jan. 31, 1967

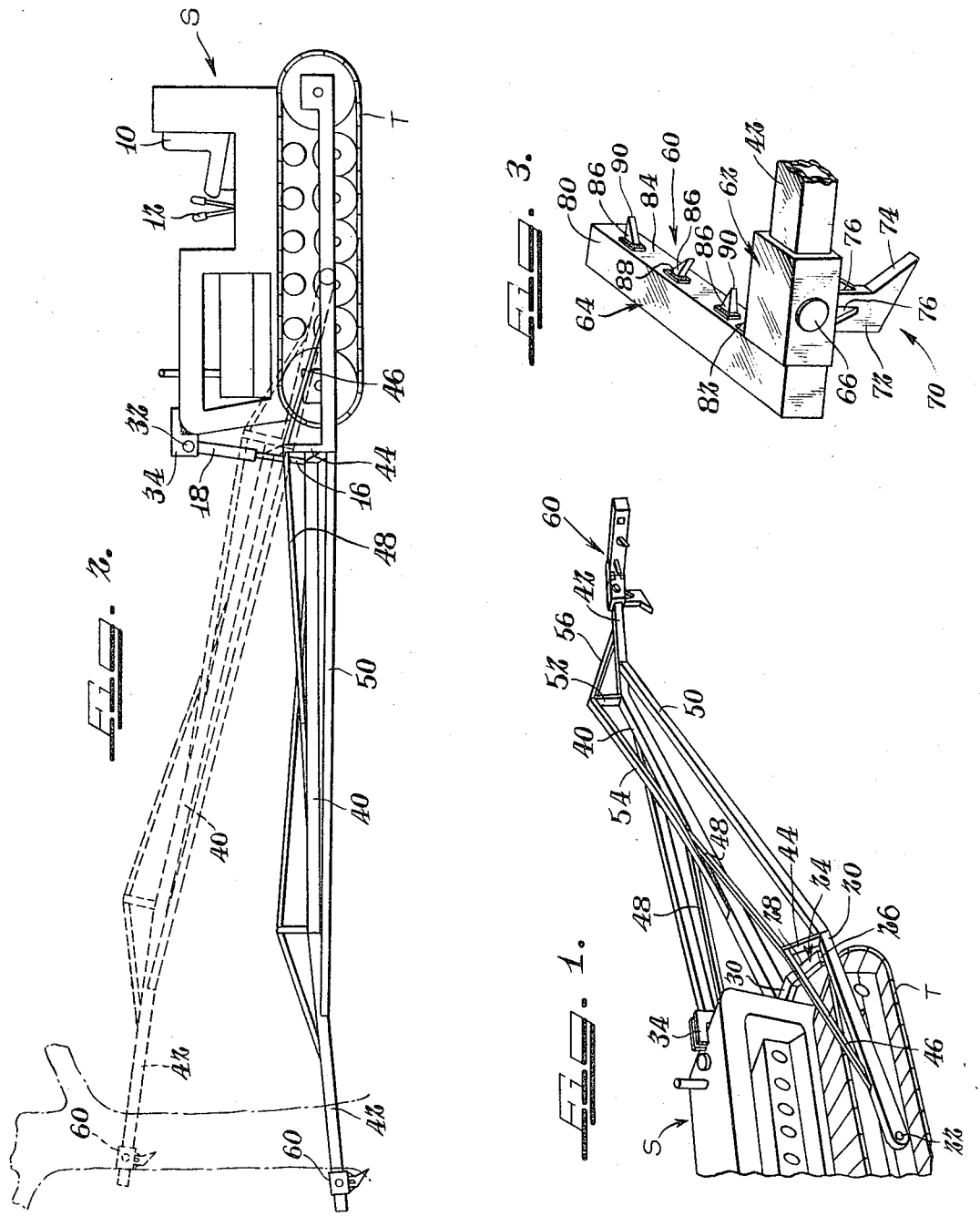

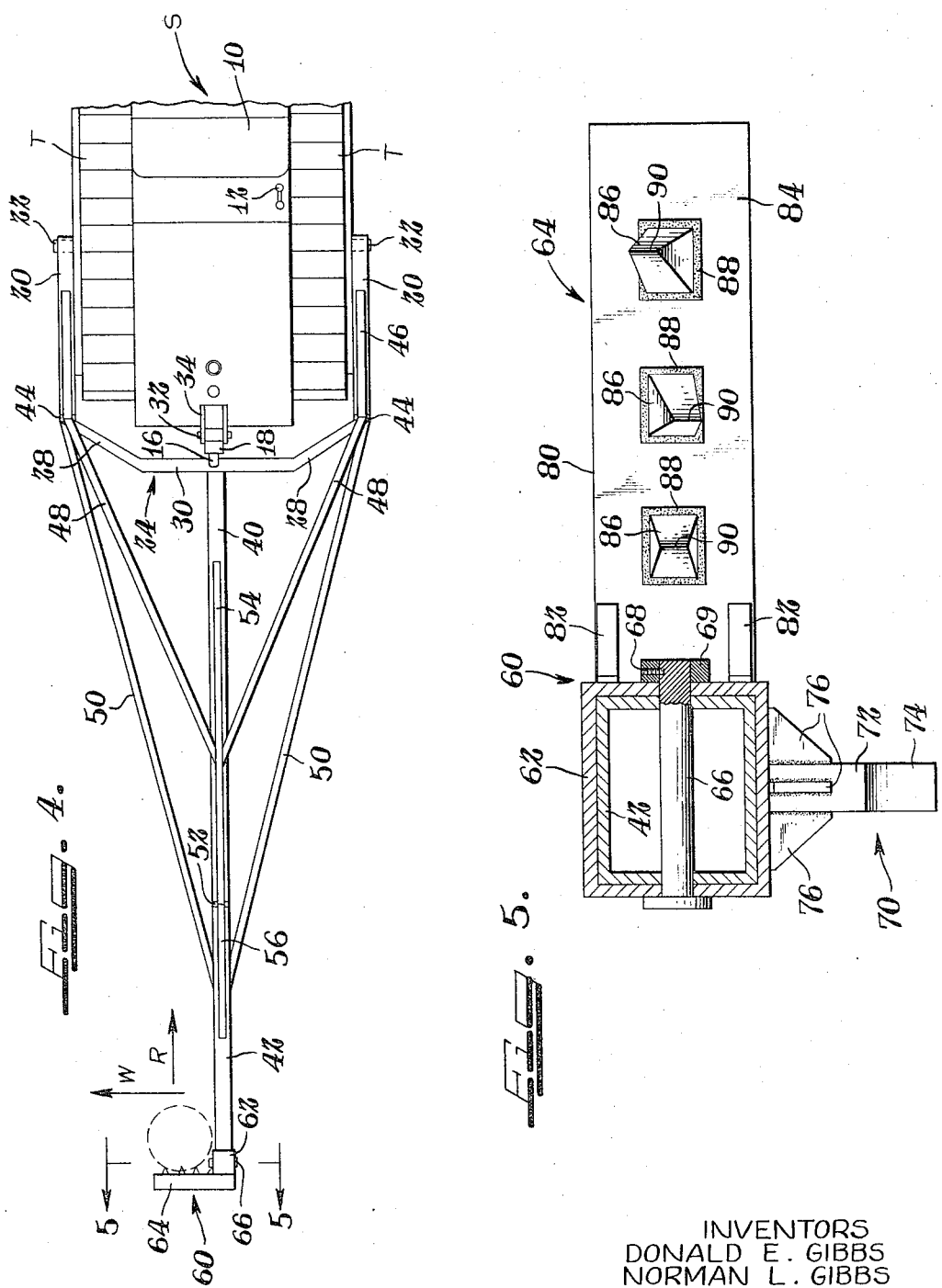

3,301,286
TREE GUIDING AND FELLING MEANS
Donald E. Gibbs and Norman L. Gibbs, both of
Modesto, Ill. 62667
Filed Dec. 24, 1964, Ser. No. 420,946
8 Claims. (Cl. 144—34)

This invention relates to tree guiding and feeling means for positioning trees to be felled in preselected locations.

In land clearing operations it is frequently necessary to fell large numbers of trees. Trees which are larger than those easily felled by manual means, such as by bulldozer blades and the like, most frequently are severed near ground level with power operated saws. Since it is desirable to position such trees in locations in which they are most easily handled for ultimate disposal, and since workmen must be protected during the felling operation, it is often necessary to use guide ropes and similar means to guide trees into preselected positions as they are felled. Such operations require expenditure of substantial time and money and present a constant source of danger to those who must climb the trees to attach the guide ropes and like means and to those in the vicinity of the falling trees.

This invention provides a novel remotely operated mechanical means for engaging a tree at an upper portion thereof while it is being severed from a base portion for guiding the upper portion of the tree into a preselected felled position for ultimate disposal.

It contemplates a tree engaging device cooperable with a raisable and lowerable elongated boom means articulatably supported on and operable by a remote self-propelled vehicle in which the tree engaging device includes an arm extending laterally of the elongated boom means and tree penetrating means on said arm facing the remote self-propelled vehicle for contacting and guiding the portion of the tree to be felled when the portion of the tree to be felled is disposed between said laterally extending arm and said self-propelled vehicle.

It is therefore an object of this invention to provide novel remotely operable tree guiding and felling means in which the tree guiding and felling means is supported by an elongated boom means and comprises an arm engageable with an upper portion of a tree to be felled for guiding said upper portion into a preselected felled position when that portion has been severed from the base portion of a tree.

A further object of this invention is to provide novel remotely operable tree felling and guiding means in which the tree guiding and felling means is supported by an elongated boom means and comprises an arm having tree penetrating means engageable with an upper portion of a tree to be felled for guiding said upper portion into a preselected felled position when that portion has been severed from the base portion of a tree.

Yet another object of this invention is to provide novel remotely operable tree felling and guiding means in which the tree guiding and felling means is supported by an elongated boom means and comprises hook means and an arm having tree penetrating means with an upper portion of a tree to be felled for guiding said upper portion into a preselected felled position when that portion has been severed from the base portion of a tree.

Also an object contemplated by this invention is the provision of novel tree guiding and felling means supported on an elongated boom means articulatably mounted adjacent one end on a self-propelled vehicle remote from said tree guiding and felling means, in which said tree guiding and felling means comprises means for connecting said tree guiding and felling means to the other end of said boom means, hook means, and an arm extending laterally of said boom means, said arm including a plurality of tree penetrating means facing said self-propelled vehicle for contacting and penetrating the portion of a tree to be felled in its upper reaches when that portion of a tree is located between said arm and said self-propelled vehicle, whereby said portion of said tree to be felled is guidable into a preselected felled position when it is severed from a base portion thereof.

These and other objects and advantages of this invention will become apparent from the following description and drawings of which FIGURE 1 is a perspective view of a device of this invention viewed from a position adjacent a self-propelled vehicle;

FIG. 2 is a side elevational view showing in phantom a tree guiding and felling means of this invention in operative engagement with the upper portion of a tree to be guided into a preselected felled position;

FIG. 3 is a partial perspective view of FIG. 1;

FIG. 4 is a plan view of FIG. 2; and

FIG. 5 is an enlarged partial rear elevational view taken substantially along line 5—5 of FIG. 4.

Referring now to the drawings which show an illustrative embodiment of this invention, a self-propelled vehicle such as a tractor S having tracks T is shown. Tractor S may be any conventional tractor upon which the tree guiding and felling means of this invention may be articulatably mounted. Tractor S includes a seat 10 for an operator and suitable controls 12 for operating the tractor itself and for operating the tree guiding and felling means of this invention.

A boom assembly 14 is articulatably mounted upon tractor S. As shown in the drawings boom assembly 14 is pivotally connected adjacent one end portion thereof to the sides of tractor S. Its remote end is raisable and lowerable by a hydraulically operated piston 16 and cylinder 18.

Boom assembly 14 includes a pair of genearlly parallel arms 20 spaced outwardly from tracks T. At their rearward ends arms 20 are pivotally mounted on the frame of tractor S by pivot pins 22. Adjacent the forward ends of arms 20, a cross piece 24 is provided. Cross piece 24 includes generally vertically disposed segments 26 connected as by welding to arms 20. Cross piece 24 includes angularly disposed segments 28 which terminate at their inner ends in central segment 30. As seen in FIGS. 2 and 4, piston 16 is secured at its outer end to central segment 30. Cylinder 18 is pivotally connected by a pivot pin 32 to a yoked block 34. Yoked block 34 is rigidly connected, as by welding, to the frame of tractor S. By means of piston 16 and cylinder 18 cross piece 24 is raisable and lowerable, thereby raising and lowering the remainder of the interconnected elements of boom assembly 14.

At the transverse center of central segment 30 a forwardly extending boom beam 40 is provided. It is connected to cross piece 24 as by welding. At the remote end of boom beam 40, and at an angle thereto, a boom end member 42 is secured as by welding. To reinforce and to stabilize boom end member 42 with respect to tractor S, additional stabilizing and reinforcing components are provided for boom assembly 14.

To that end, a vertical column 44 is provided at the end of each arm 20. Tension bars 46 and angularly disposed tension members 48 are provided. Tension bars 46 are connected, at their ends, as by welding, to arms 20 and columns 44. Tension members 48 are connected at their ends, as by welding, to vertical columns 44 and to boom beam 40. Directly in front of arms 20 angularly disposed struts 50 are provided. Each is secured, as by welding, at one end to an arm 20 and at the remote end to boom end member 42.

At the intersection of boom beam 40 and boom end member 42 a generally vertical disposed column member 52 is provided. Interconnecting suspension bar 54 and suspension member 56 are secured as by welding, the former to boom beam 40 and to vertical column member 52, the latter to column member 52 and boom end member 42.

By means of the members described, boom assembly 14 provides a stable, relatively rigid boom for a releasably connectable tree guiding and felling member 60. As seen in FIG. 3, in transverse cross-section, boom end member 42 is a rectangular channel adapted to be received in and to be releasably connected to tree guiding and felling member 60. Tree guiding and felling member 60 is generally L-shaped and includes a sleeve segment 62 and a laterally extending arm segment 64. Sleeve segment 62 is rectangular in transverse cross-section and has an internal peripheral configuration substantially the same as that of the outer peripheral configuration of boom end member 42 to provide a snug sliding fit therebetween. A connecting pin 66 having enlarged heads at opposite sides releasably connects boom end member 42 to member 60. As seen in FIG. 5 the releasable connection is provided by a threaded locking screw 68 received in an opening in the shank of connecting pin 66, the locking screw being threadedly received in a threaded opening in removable head 69. As seen in FIG. 5 suitable aligned openings are provided in members 42 and 62 to receive connecting pin 66.

Beneath sleeve segment 62 a generally vertically disposed rearwardly facing hook 70 is provided. Hook 70 includes a vertical shank 72 and a rearwardly angled hook portion 74. Hook 70 is rigidly secured to sleeve segment 70 by a plurality of generally vertically disposed reinforcing plates 76 which are secured as by welding to hook 70 and sleeve segment 62.

Arm 64 includes a rectangular bar 80 secured as by welding at the forward end of sleeve segment 62. A pair of generally horizontally disposed plates 82 located adjacent the intersection of bar 80 and sleeve segment 62 are provided to maintain a rigid generally right angle relationship between bar 80 and sleeve segment 62.

Tree penetrating means are provided on the rearwardly facing surface 84 of bar 80. As shown, the tree penetrating means comprises a plurality of teeth 86 secured as by welds 88 to surface 84. Teeth 86 define elongated generally vertical crests 90. It is contemplated, however, that the tree contacting and penetrating portions of teeth 86 may take other forms. As best seen in FIG. 5 teeth 86 are variously angled to provide for contacting and penetrating tree portions of varying configurations. The varied angling of teeth 86 also facilitates a more positive gripping of the portion of a tree contacted and penetrated when the penetrating means have entered the tree.

In operation, tractor S is positioned near the tree to be felled with the portion of the tree to be contacted and guided into a felled position located between the tractor S and arm segment 64. The boom assembly 14 is raised, such as shown in phantom in FIG. 2, by the associated piston 16 and cylinder 18 until the tree guiding and felling member 60 is at an appropriate elevation. Usually the appropriate elevation is in the upper reaches of the tree to be felled and is somewhat above the center of gravity of the portion of the tree to be felled so that it will not fall rearwardly or away from tractor S. Once the tree guiding and felling member 60 is at an appropriate elevation tractor S is moved rearwardly until arm segment 64 and teeth 86 contact the portion of the tree to be felled, usually the trunk portion, and the teeth 86 penetrate that portion. It is desirable to so position boom end member 42 so that sleeve segment 62, or boom end member 42, or both, contacts the tree as well, such as shown, for example, in FIG. 4.

The tractor then maintains a predetermined degree of rearward force against the portion of the tree to be felled as it is being severed from its base portion. The severing may be by means such as a power operated saw. In addition to the rearward force exerted, a component of sideward force may also be exerted such as by selectively operating tracks T of tractor S to give a sideward component of force. The components of force exertable are exemplified by the arrows in FIG. 4 which are marked R for rearward and W for sideward forces exertable by tractor S for guiding the severed portion of the tree into a preselected felled position.

Hook 70 may engage branches or other parts of the portion of a tree to be felled which are adjacent the portion contacted by arm segment 64 when a tree is appropriately configured. Hook 70 is also operable from tractor S to guide and retrieve felled trees such as from beds of streams and other locations into preselected positions for ultimate disposal.

While the self-propelled vehicle has been illustratively described as a tractor, other self-propelled vehicles such as wheeled vehicles may also be used with the tree guiding and felling and guide means of this invention. Similarly other modifications within the scope of this invention will become apparent to those of ordinary skill in the art from the foregoing description and accompanying drawings.

We claim:

1. Tree guiding and felling means cooperable with a self-propelled vehicle and cooperable with severing means for selecting the position in which the upper portion of a standing tree is to lie when severed from its base portion comprising an elongated boom articulatable at one end by a self-propelled vehicle for raising and lowering the remote end of said boom, a tree guiding means secured to said boom adjacent its remote end, said tree guiding means including a generally horizontally disposed arm extending laterally of said boom and cooperable with said boom for engaging a tree when the upper position of said tree to be engaged is disposed between said arm and said one end of said boom, and means facing said one end of said boom for penetrating the portion of a tree to be felled.

2. The tree guiding and felling means of claim 1 in which said penetrating means comprises a plurality of teeth.

3. The tree guiding and felling means of claim 1 in which said penetrating means comprises a plurality of teeth each defining a vertically disposed elongated crest.

4. Means for guiding and felling a tree, the upper reaches of which are to be severed from its base, comprising a tractor, an elongated boom articulatably mounted on said tractor at one end portion of said boom for raising and lowering the other end portion of said boom, tree engaging means secured to said other end portion of said boom, said tree engaging means including a generally horizontally disposed arm extending laterally of the other end portion of said boom and cooperable with said boom for engaging the upper reaches of a tree when the upper reaches to be engaged are disposed between said arm and said tractor, tree penetrating means facing said tractor and secured to said arm for penetrating said tree when said boom and said tree engaging means are in operative engagement with the upper reaches of a tree, whereby when the upper reaches of a tree are severed from the base the tree is guided into a preselected felled position.

5. The means for guiding and felling a tree of claim 4 in which said tree engaging means is generally L-shaped and includes a sleeve for receiving and being releasably connected to said other end portion of said boom.

6. The means for guiding and felling a tree of claim 5 in which said tree penetrating means comprises a plurality of teeth.

7. The means for guiding and felling a tree of claim 6 in which said tree engaging means further comprises a generally vertically disposed hook cooperable with said boom and with said tree engaging means for retrieving and for guiding and felling a tree.

8. A device for guiding trees to be felled into preselected felled positions cooperable with an elongated articulated boom operable from a remote self-propelled vehicle, said device comprising means for securing said device to a boom, an arm engageable with the portion of a tree to be felled, said arm including tree penetrating means for penetrating the portion of a tree to be felled when the portion of the tree to be felled lies between said arm and the self-propelled vehicle, and hook means secured to said device cooperable with said device for guiding trees to be felled and felled trees into preselected felled positions.

References Cited by the Examiner

UNITED STATES PATENTS

| | | | |
|---|---|---|---|
| 2,191,048 | 2/1940 | Tims | 254—132 |
| 2,233,821 | 3/1941 | Ramer | 37—2 |
| 2,613,458 | 10/1952 | Harrell | 37—2 |

WILLIAM W. DYER, JR., *Primary Examiner.*

W. D. BRAY, *Assistant Examiner.*